United States Patent
Pullen

(10) Patent No.: US 10,123,272 B2
(45) Date of Patent: Nov. 6, 2018

(54) METHOD FOR REDUCING THE POWER CONSUMPTION OF A MOBILE DEVICE

(71) Applicant: Conversant Wireless Licensing S.a r.l., Luxembourg (LU)

(72) Inventor: Mel Pullen, St. Helier (IE)

(73) Assignee: Conversant Wireless Licensing S.a r.l., Luxembourg (LU)

(*) Notice: Subject to any disclaimer, the term of this patent is extended or adjusted under 35 U.S.C. 154(b) by 0 days.

(21) Appl. No.: 15/279,049

(22) Filed: Sep. 28, 2016

(65) Prior Publication Data

US 2017/0118711 A1    Apr. 27, 2017

Related U.S. Application Data

(63) Continuation of application No. 12/303,335, filed as application No. PCT/GB2007/002112 on Jun. 7, 2007, now abandoned.

(30) Foreign Application Priority Data

Jun. 9, 2006 (GB) .................................. 0611480.5

(51) Int. Cl.
*H04W 52/02* (2009.01)
*H04W 72/04* (2009.01)

(52) U.S. Cl.
CPC ... *H04W 52/0232* (2013.01); *H04W 52/0238* (2013.01); *H04W 72/0446* (2013.01)

(58) Field of Classification Search
CPC ......... H04W 52/0232; H04W 52/0238; H04W 72/0446
See application file for complete search history.

(56) References Cited

U.S. PATENT DOCUMENTS

| | | | | |
|---|---|---|---|---|
| 6,993,357 B1* | 1/2006 | Ito | ..................... | H04W 52/0261 370/328 |
| 7,610,057 B2* | 10/2009 | Bahl | ..................... | H04W 88/06 455/432.3 |
| 2003/0125019 A1* | 7/2003 | Bajikar | ............. | H04W 72/1215 455/420 |
| 2003/0193918 A1* | 10/2003 | Cain | ..................... | H04B 7/0408 370/337 |
| 2004/0192309 A1* | 9/2004 | Watanabe | ......... | H04W 36/0038 455/439 |
| 2005/0181734 A1* | 8/2005 | Coutts | ................... | H04W 48/18 455/67.16 |
| 2006/0292986 A1* | 12/2006 | Bitran | ................... | H04W 16/14 455/41.2 |
| 2007/0211657 A1* | 9/2007 | McBeath | .......... | H04W 72/0446 370/329 |
| 2010/0016035 A1* | 1/2010 | Pullen | ................... | G06F 1/3203 455/574 |

* cited by examiner

*Primary Examiner* — Brandon J Miller
(74) *Attorney, Agent, or Firm* — Conversant Wireless Licensing

(57) ABSTRACT

Where a communications device maintains multiple wireless connections to other devices and networks which use slotted communications protocols, the slots used by those protocols are arranged so as to minimize the power consumed by the device. Where multiple radios are used, power is minimised by avoiding using radios at the same time when those radios are likely to interfere with each other. Slots used by communication protocols can also be selected to maximize the time that the communications device can spend in lower power mode.

17 Claims, 9 Drawing Sheets

METHOD FOR REDUCING THE POWER CONSUMPTION OF A MOBILE DEVICE

CROSS-REFERENCE TO RELATED APPLICATIONS

This application is a continuation of U.S. patent application Ser. No. 12/303,335 filed on Aug. 21, 2006, which was the National Stage of International Application No. PCT/GB2007/002112 filed Jun. 7, 2007, which claims benefit of United Kingdom Application No. 0611480.5 filed Jun. 9, 2006. The above-identified application is herein incorporated by reference in its entirety.

The present invention relates to a method for reducing the power consumption of a mobile device and in particular, to a method for improving power management of any device that operates with wireless communications which uses multiple radios and/or services multiple accounts.

It has long been known that the use of slotted protocols improves the efficiency of networked communications using a shared communication medium. The principle was first established at the University of Hawaii in the development of the slotted Aloha protocol used in the first ever wireless computer network (see "Excess capacity of a slotted aloha channel" by Norman Abramson, ARPANET Satellite System Note 26 12735, Stanford Research Institute, November 1972) and was incorporated from there into many subsequent network protocols.

The basis of the slotted protocol is that all transmissions over the shared medium used for network communications are required to consist of packets that must be completely transmitted during a series of fixed time slots, with the slot scheduling determined by means of timers synchronised between all participating entities. This method is twice as efficient as non-slotted protocols, which allow transmission over the shared medium to commence at any time. This is because slotting halves the probability of two or more entities trying to use the network at the same time, which results in packet collision and subsequent retransmission.

Such protocols are widely used in modern wireless communications, as shown the attached figures. FIG. 1 shows the GSM protocol; FIG. 2 shows the UMTS protocol; FIG. 3 shows the Bluetooth protocol, while FIGS. 4 and 5 show versions of the 802.11 protocol. Finally, FIG. 6 shows the DECT protocol used in modern digital cordless telephony.

Recent developments in wireless communications have additionally made use of the fact that slotted protocols can be used to implement power saving strategies. These can be used by all modern computing devices which include the capability of acting as a mobile terminal (MT) when connected to wireless communications networks. Such device include, without being limited to, desktop and laptop computers, Personal Digital Assistants (PDAs), mobile telephones, smartphones, set-top boxes and games consoles, together with converged devices incorporating the functionality of one or more of the classes of device already mentioned, as well as many other industrial and domestic electronic appliances such as digital cameras and digital music players.

Power-saving strategies are especially important for battery operated mobile terminals, for which power is a scarce resource and power saving is a key design and usability constraint. The requirements of wireless communication protocols are typically one of the major drains on the batteries of such devices. The considerations involved are well stated by Chen, Sivalingam and Agrawal "*Mobile computers typically have limited energy for computing and communications because of the short battery lifetimes. Consenting battery energy in mobiles should be a crucial consideration in designing protocols for mobile computing. This issue should be considered through all layers of the protocol stack, including the application layer.*" from Performance comparison of battery power consumption in wireless multiple access protocols, in Wireless Networks 5 (1999) pp 445-460)

It should however be noted that while there is apparently greater utility in implementing power-saving strategies on battery-operated mobile devices, there are considerable benefits to be gained by saving power even on devices that utilise mains electricity, for where such electricity is generated from non-renewable or fossil sources, it is known to contributed to greenhouse gases and global warming. A small saving in one device, when agglomerated over all the applicable devices, can result in a substantial global saving.

Possibly, the simplest such power-saving strategy that can be utilised with a slotted protocol can be implemented at the device level and allows devices to turn off the radios used for wireless communications during time slots when it is known that no communications will occur.

"*One possible way to reduce receiver power-on time is to broadcast a data transmission schedule for each mobile. This will enable a mobile to switch to standby mode until its alloted slots.*" from Chen et al, op. cit.

"*Letting nodes sleep is the most effective way to conserve energy in a wireless network . . . a periodic beacon . . . provides a coarse-level synchronisation and denotes the start of a superframe. A superframe has two parts: a reservation window, during which potential senders announce transmission requests, and a data transmission window, during which the actual packet transmissions take place. Receivers can then sleep for most of the second part, except for the periods when announced transmissions occur.*" from 'Tradeoff Analysis of PHY-aware MAC in Low-Rate, Low-Power UWB networks' Alaeddine El Fawal, Jean-Yves Le Boudec, Ruben Mers, Bosidar Radunovic, Jorg Widmer, and Gian Mario Maggio, EPFL Technical Report IC/2005/032

One instance of designing protocols especially for mobile computing can be found in "A Short Look on Power Saving Mechanisms in the Wireless LAN Standard IEEE 802.11", in J. M. Holtsmann and M. Sorsi, editors, Advances in Wireless Communications, pp. 219-226, Kluwer, April 1998. This describes how devices may turn off their radios between time slots when using 802.11 Wireless Ethernet (WiFi) protocols. Similar techniques are used in Bluetooth communications, which operates in the same frequency bands as 802.11.

A general account of a number of techniques for reducing the power consumption networked computing devices can be found in a 1997 presentation for the Center for Embedded Computer Systems at the University of California by Rajesh K. Gupta 'Power Management Considerations for Networked Devices' (ICCAD 1997 TUTORIAL Part II: Basics of Wireless Communication Systems'); this can be found online at http://www.ics.uci.edu/~rgupta/talks/vlsi02/vlsi02-power.ppt.

The measures referred to above deal with how a device can save power when utilising a single wireless connection. However, there is no prior art that addresses the problems of maximising power savings when a device is making use of multiple wireless connections. The perception behind this invention is that maximising the power savings on each individual wireless connection does not necessarily maximise the power savings for the device as a whole.

This can be seen most clearly in the hypothetical case of a wireless computing device which is maintaining two wireless connections, $W_1$ and $W_2$ over two separate radios with two separate protocol stacks. It is a fact that activity on such devices tends to occur in bursts; most of the time they are in some type of low power mode, only waking up at intervals (determined by the slots allocated by the relevant protocols) to see if there is any need to communicate. Let us further assume that there are ten possible time slots, $T_1$ to $T_{10}$ available to such a device. There are two scenarios that can be considered:

1. The first scenario is where $W_1$ and $W_2$ do not interfere with each other, and are both able to function at the same time. If this is the case, there are power savings to be made by having both connections share the same time slot, as the computing device would then only need to come out of low power mode for a single slot. Were $W_1$ and $W_2$ to be using different time slots, the power consumption would effectively be doubled as the device would need to come out of low power mode for two time slots.
2. The second scenario, which more realistically applies to modern computing devices, is where $W_1$ and $W_2$ do interfere with each other; attempting to use radio receivers and transmitters simultaneously in mobile devices when they are separated by only a few millimetres is extremely likely to be unsuccessful for this reason. If this is the case, there are power savings to be made by ensuring that both connections do not share the same time slot, as the computing device would then have come out of low power mode and activated both radios only to have each of their communications fail due to interference.
    Where $W_1$ and $W_2$ cannot share the same timeslot, it is additionally possible that even more power savings could be made by making use of adjacent time slots such as $T_3$ and $T_4$ rather than separated slots such as $T_2$ and $T_7$; this is because in the former case the device would only need to come out of low power mode once, while in the latter case the substantial overheads of entering and leaving low power mode would be incurred twice.

Thus it can be seen that it is not possible to optimise power usage in a computing device operating multiple radios by considering each connection in isolation; optimisation can only be arrived at by taking all the connections together.

It should be noted that where there are more that two radios, some of which can share the same timeslots and some of which cannot share the same timeslots, both of the above scenarios may operate simultaneously.

A common example of a computing device which maintains multiple wireless connections would be a mobile telephone with connections to a cellular network, to an 802.11 wi-fi network and also to Bluetooth. It is expected that many other additional wireless connections will become available to such computing devices in the future, such as telephones that are able to maintain multiple simultaneous cellular connections (such as two or more GSM services or a mixture of GSM and CDMA services). Currently, simultaneous multiple accounts are not managed well by mobile telephones, and typically require two separate devices.

In summary, the problems in power optimisation posed by computing devices with multiple wireless standards have not hitherto been dealt with.

Though there has been some innovation in the area of devices with multiple wireless connections from Broadcom Corporation, their InConcert™ technology is aimed at maximising throughput when using 802.11 and Bluetooth networks, which use the same frequencies; it should be noted that this is a different problem which requires a different solution, and is not related to power reduction nor with managing multiple accounts.

According to a first aspect of the present invention there is provided a method of minimising the power consumption of a communications device maintaining multiple wireless connections to other devices and networks, the method comprising simultaneously coordinating the arrangement of the slotted communications protocols used by each of the said wireless connections.

According to a second aspect of the present invention there is provided a communications device arranged to operate in accordance with a method of the first aspect.

According to a third aspect of the present invention there is provided an operating system for causing a communications device to operate in accordance with a method of the first aspect.

Embodiments of the present invention will now be described, by way of further example only, with reference to the accompanying drawings, in which FIGS. 1 to 6 show various communications protocols;

Figure 1:
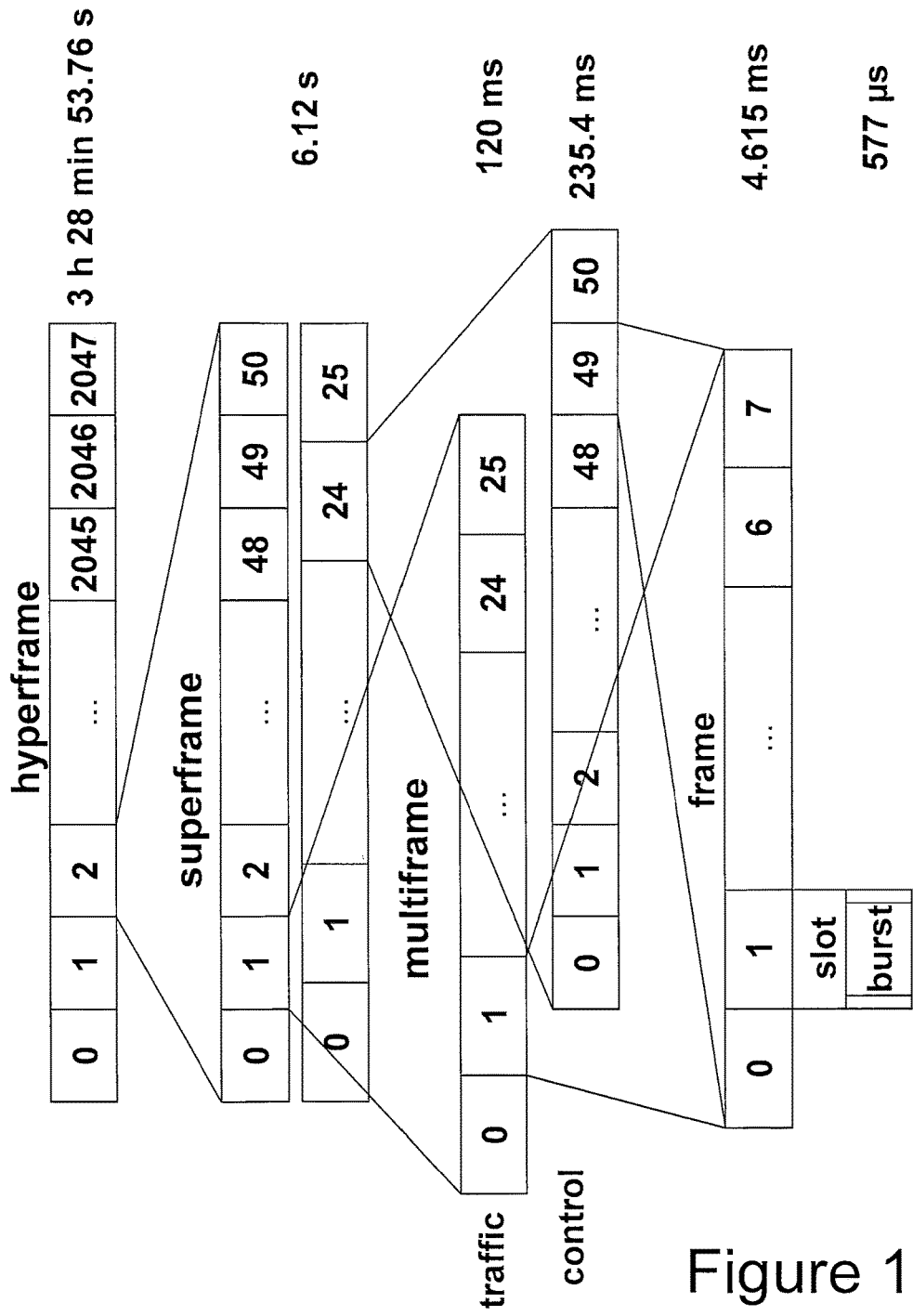
Figure 2:
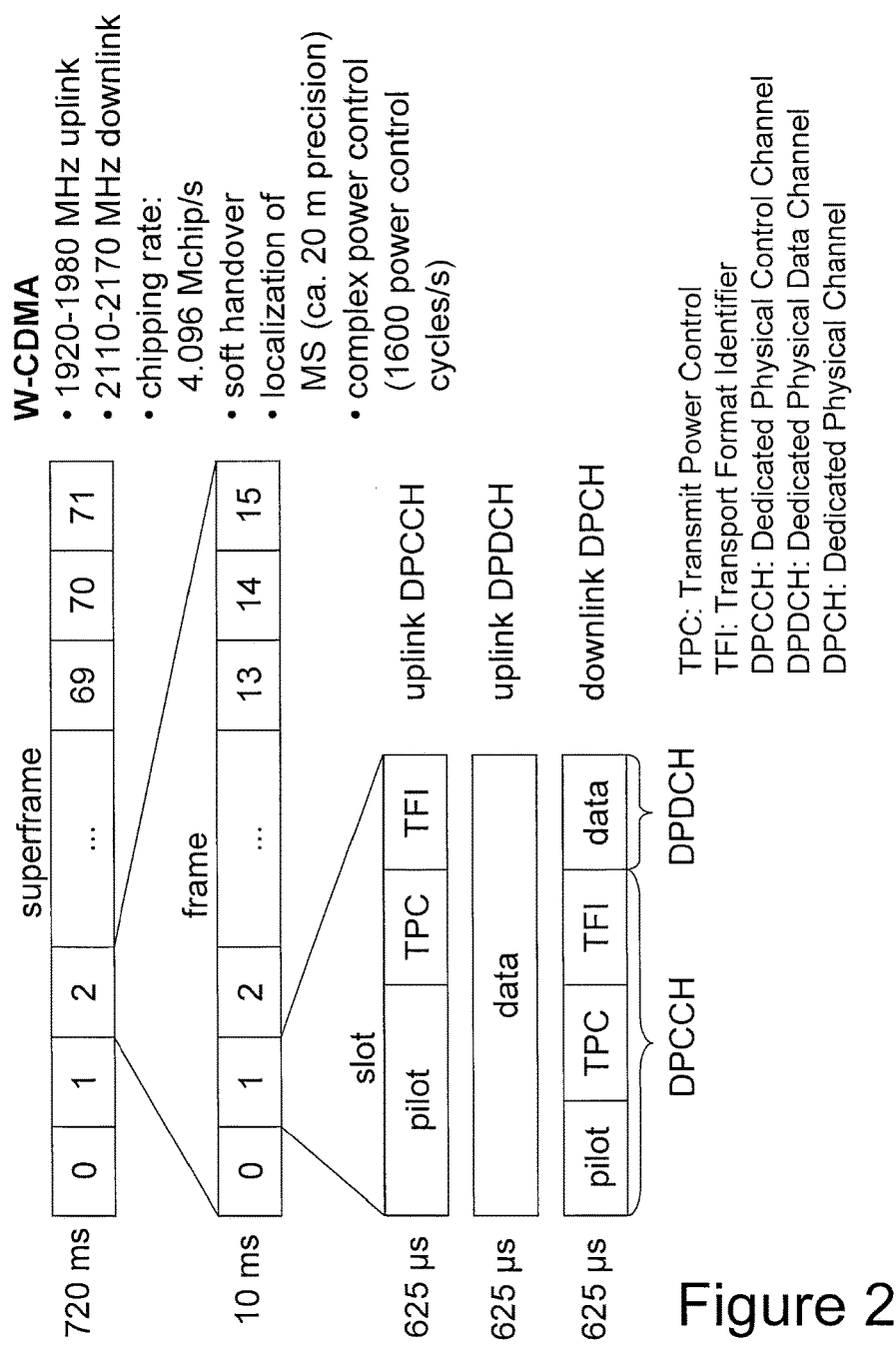
Figure 3:
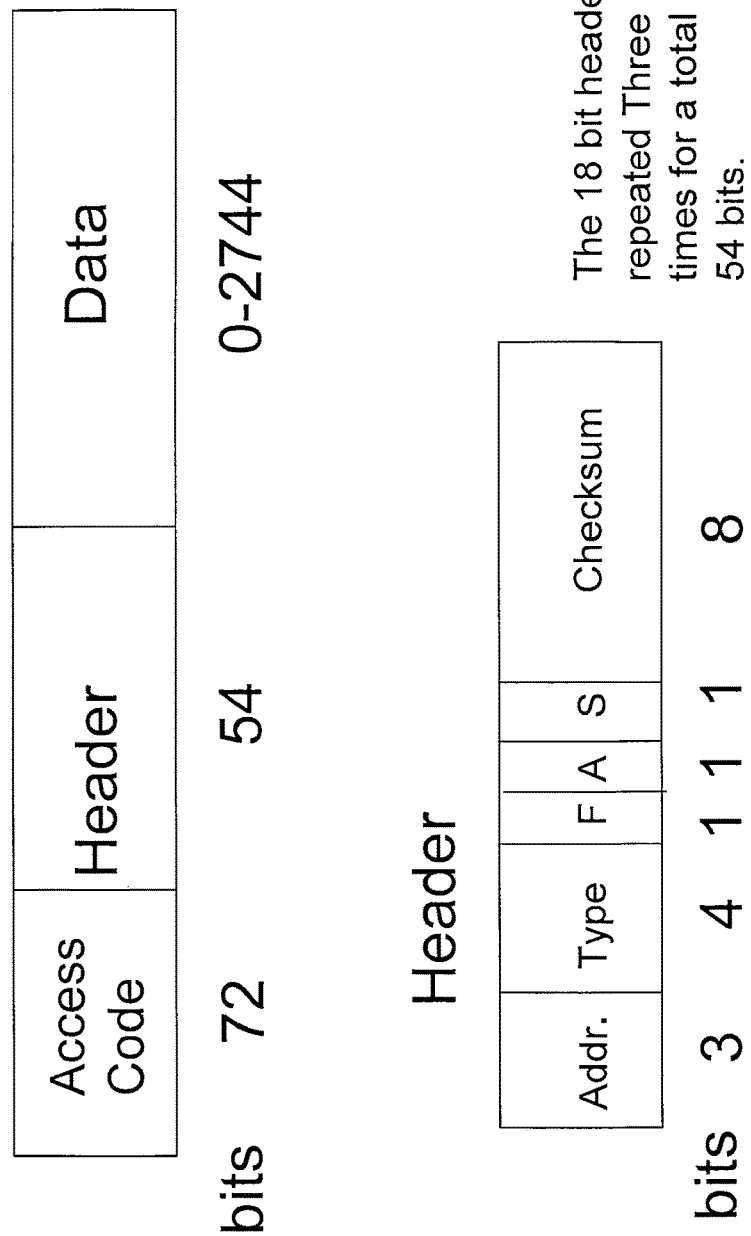
Figure 4:
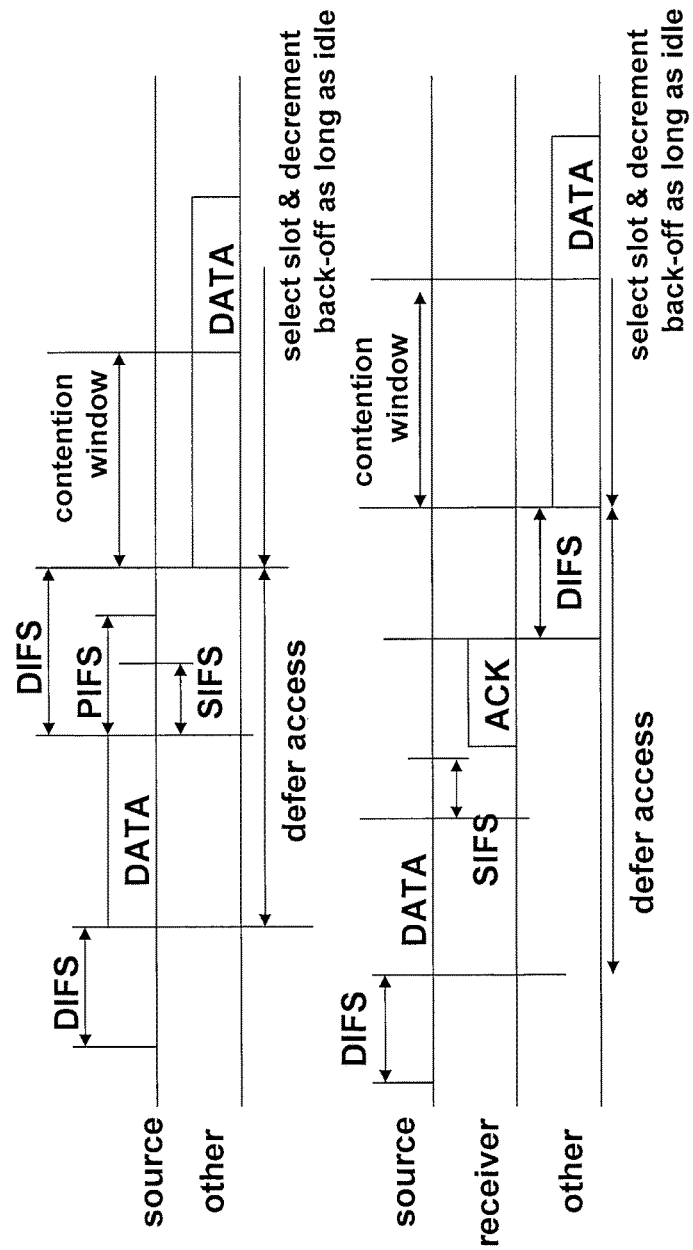
Figure 5:
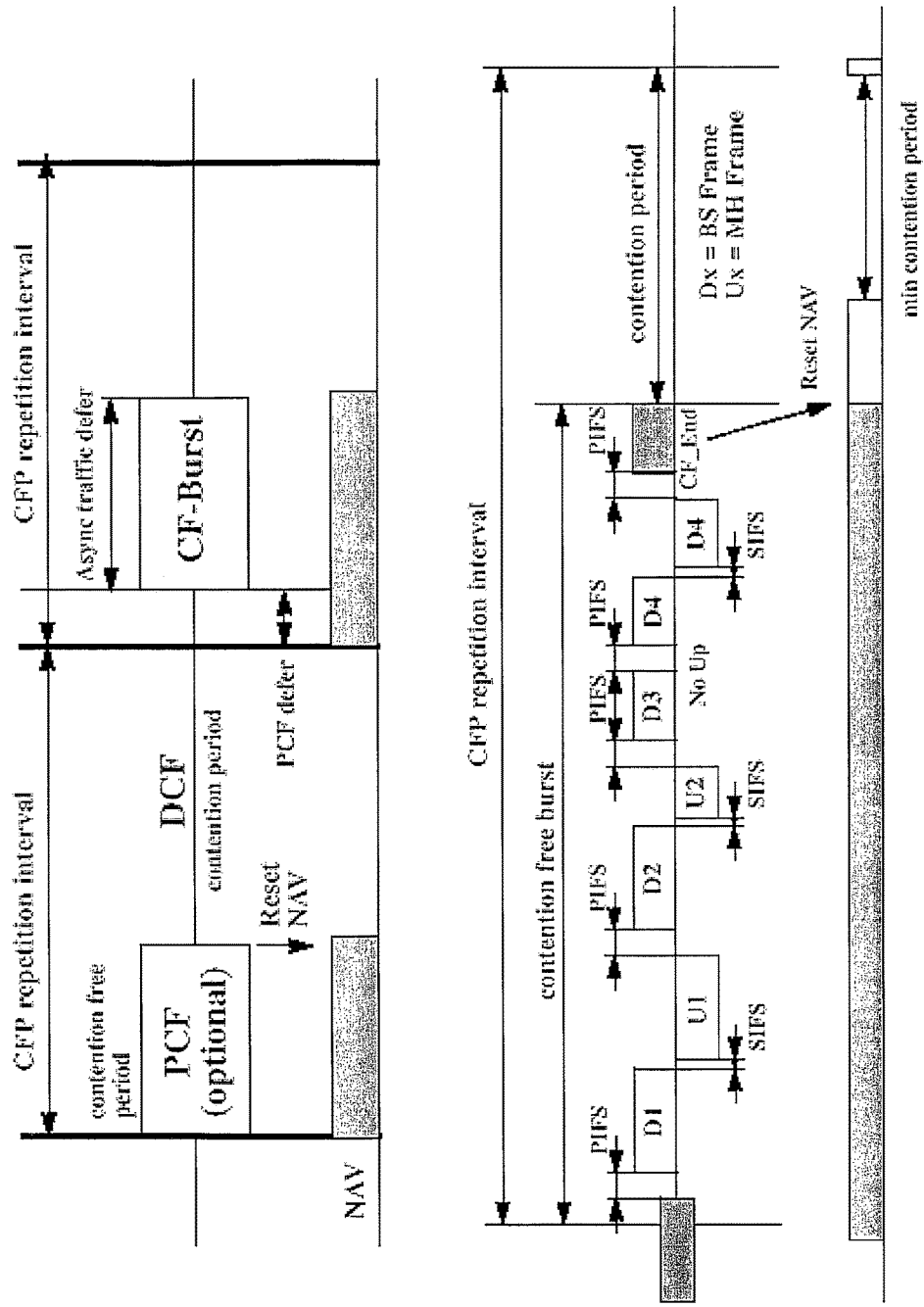
Figure 6:
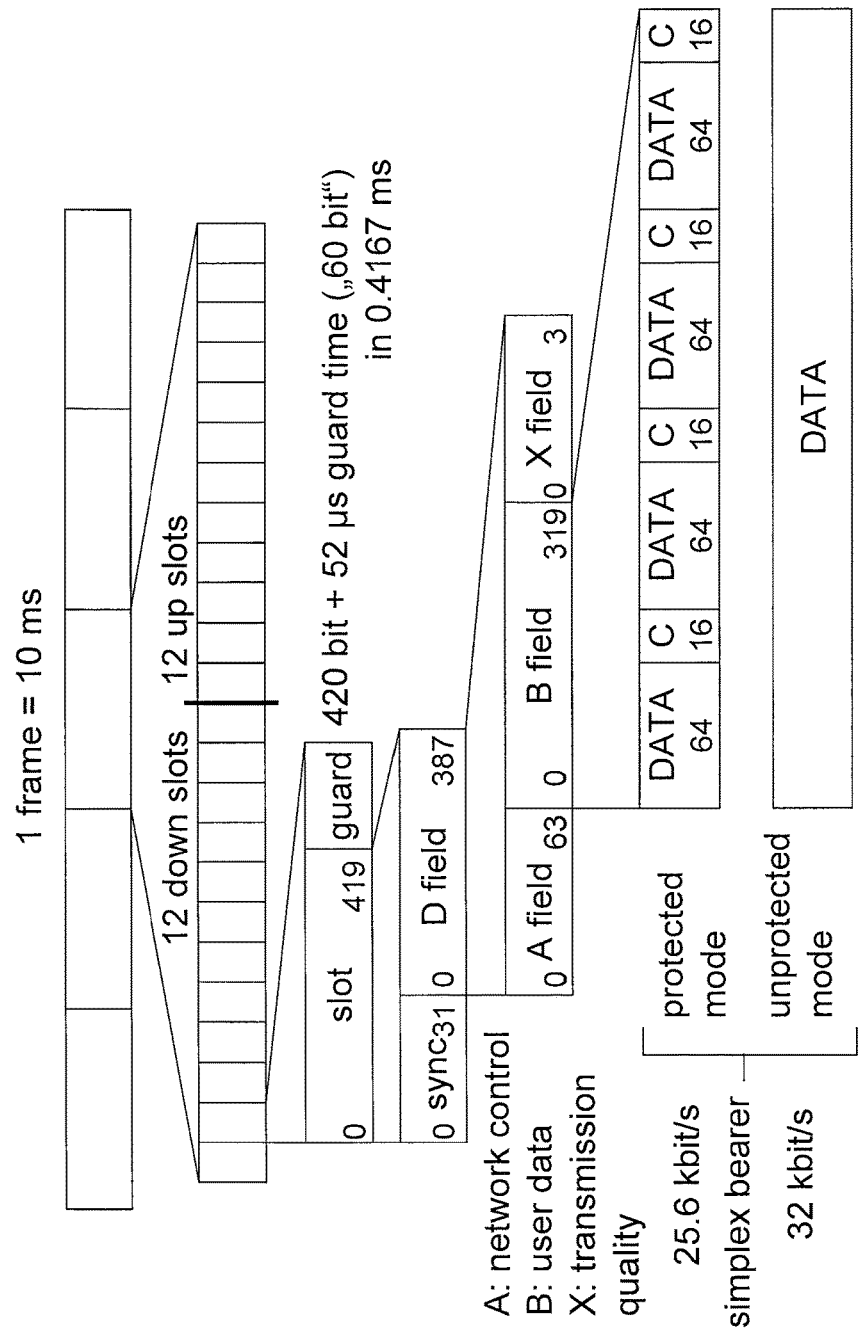

An ideal situation would be for wireless communication protocols to allow mobile terminals to negotiate with other elements in the network infrastructure in order to define the slots that they will listen on. However, the allocation of slots in existing protocols is either pre-defined or, where variation is allowed, this is normally done outside the control of the mobile terminal; for example, this is part of the functionality provided in the Base Station Controller/Base Transceiver Station in 3GPP cellular networks. In the absence of any framework for influencing slot allocation, a mobile terminal has to select the best match from the various options available.

In normal use, where multiple radios are known to interfere with each other, this will quite possibly involve dropping some paging slots if there is a clash. It should be noted that there is no reason why this cannot be done. For all slotted protocols, there is some degree of flexibility and redundancy in the usage of the slots allocated, and for a mobile terminal to miss a transmission in one or more slots is not critical.

Therefore, provided it is possible to control the available radio interfaces, a computing device implementing multiple slotted protocols can arrange to do so in a way that optimises power usage.

The current generation of computing devices enabled for wireless communications (such as cellular, WiFi and Bluetooth) generally rely on dedicated hardware to handle the radio related aspects of their operation. Typically, these consist either of specific chipsets or else of customised Application Specific Integrated Circuits (ASICs) for each radio interface. These handle the modulation and demodulation of signals together with much of the lower levels of the communications protocols associated with the communication. The implementation of the protocols in dedicated hardware is predetermined by the manufacturer and does not offer the flexibility needed to adjust the parameters of the communications protocols in use to take advantage of this invention.

Therefore a preferred implementation of this invention makes use of computing devices with one or more generic Software Defined Radios rather than dedicated hardware. A Software Defined Radio (SDR) is one that handles all the modulation and demodulation of wireless signals in software rather than relying on any dedicated hardware circuitry; it is anticipated that in the future, computing devices will be able to utilise wireless communications methods by means of SDR which would otherwise only be accessible if a suitable dedicated radio ASIC had been included in the device at manufacture time. The Software Defined Radio Forum (http://www.sdrforum.org/) exists to promote and develop this technology.

It should be noted that while SDR technology lends itself to the implementation of this invention, the description and claims contained herein are not intended to preclude any implementations that are based on more flexible dedicated hardware solutions.

The basic elements of a system implementing this invention are as follows:

The computing device is provided with a respective applications programming interface (API) for each radio. The API supplies information and methods relating to the controlling of its power usage, together with information and methods which define and control its receipt of paging requests from other wireless devices. An example API is provided below.

The computing device is additionally provided with a single software component that is aware both of the power constraints to which the device is subject and also of the communication networks and services to which the user wishes to remain connected. This information may be provided by the user either directly or indirectly (via a link to overall settings such as user profiles) or may be arrived at programmatically, using inbuilt rules.

This software component can also be provided with other items of information which may affect the operation of the device. Although the aim is to reduce the total power consumption, manipulating the standard workings of a communication protocol can affect other aspects of performance, such as Quality of Service (QoS). As an example, a computing device that polls the airwaves for signals ten times per second is going to be able to provide a quicker response than a computing device that polls for signals once every second. The ability of the invention to take account of additional information relating to issues such as QoS, which vary depending on the circumstances and needs of the user, is considered to be one of the advantages of this invention.

The various slotted communication protocols can then be evaluated to decide on an optimal selection of paging slots for which the radios on the device will be woken up; the APIs provided for each radio are used to implement the consequent strategy.

A preferred implementation of this invention on a computing device which itself implements low-power mode may be to pre-process all the available data in order to ensure that no radio interferes with any other radio, and that the time spent in sleep or idle mode was as long as possible.

Note that if the device is maintaining wireless connections to multiple accounts on services such as cellular networks, the single software component referred to above will need to ensure that the relevant identities on the appropriate networks have all been registered before setting up exclusive slots to monitor each account.

Furthermore, 'interleaving' the power on times of the various radios will be essential when software defined radio is used (either single converter or multiple IF selection), as there is effectively a single piece of hardware.

This utility can be extended if the computing device or MT can define the slots it will listen on. At present the slot structure is defined either by the protocol or where variation is allowed, this is normally in the base station controller (BSC) and/or the base transceiver station (BTS). Without this, the best match of the various options will have to be selected, perhaps dropping some paging slots when there is a clash.

An API to control multiple software defined radios in such a way as to minimise the power consumption will now be described. This control is achieved by only operating radios one at a time. The common 'burst' mode activities of the radios being considered allows this mechanism to be implemented.

Radios may be operated intermittently to reduce power consumption. These bursts of activity may be to send or receive a beacon (synchronise, scan—depends on the radio standard) or to send or receive data.

Figure 7:
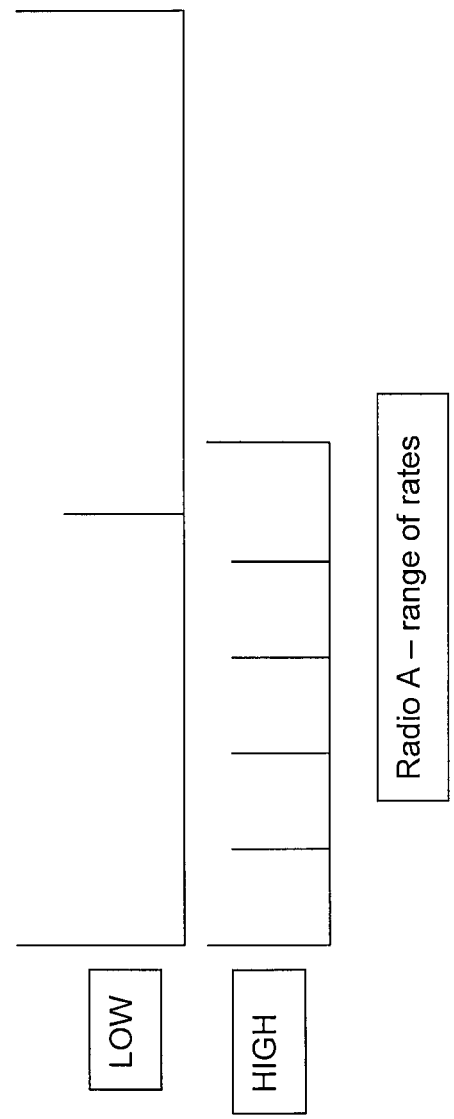
FIGS. 7 and 8 show radio repetition rates.
Figure 8:
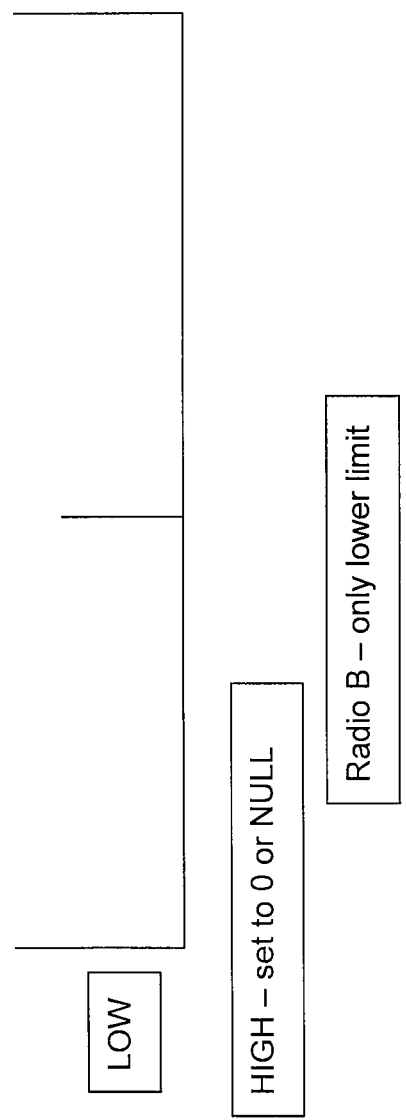

Radios may have a range of repetition rates that are continuously variable between two ranges as shown in FIG. 7 or they may have only a lower limit as shown in FIG. 8, in which case the upper limit would be that the radio can be on continuously.

A radio may also have a set of defined rates instead of a range. It may also have a set of defined frequencies, phase and number of cycles. These may be different for different modes and in different rates.

Overview of the API

The API contains two parts. The first part is the set of data structures that contain data about the radios available to be controlled. The second part is the set of commands that most radio systems will be expected to respond to. This second part is based on the commands used in the Software Defined Radio Commercial Handset guidelines (SDRF-04-A-0006-V0.0 25 Aug. 2004) issued by the SDR Forum (www.sdrforum.org). Note there are no standards for the data structures that define the possible configurations of the radios.

Inquiry Tree

A radio subsystem can be queried (e.g. via the operating system of the mobile communications device) to determine the characteristics of each of the radios. Below the level of this API there may be a 'plug in' mechanism to allow different physical radio hardware to represent itself as part of the radio subsystem.

Figure 9:
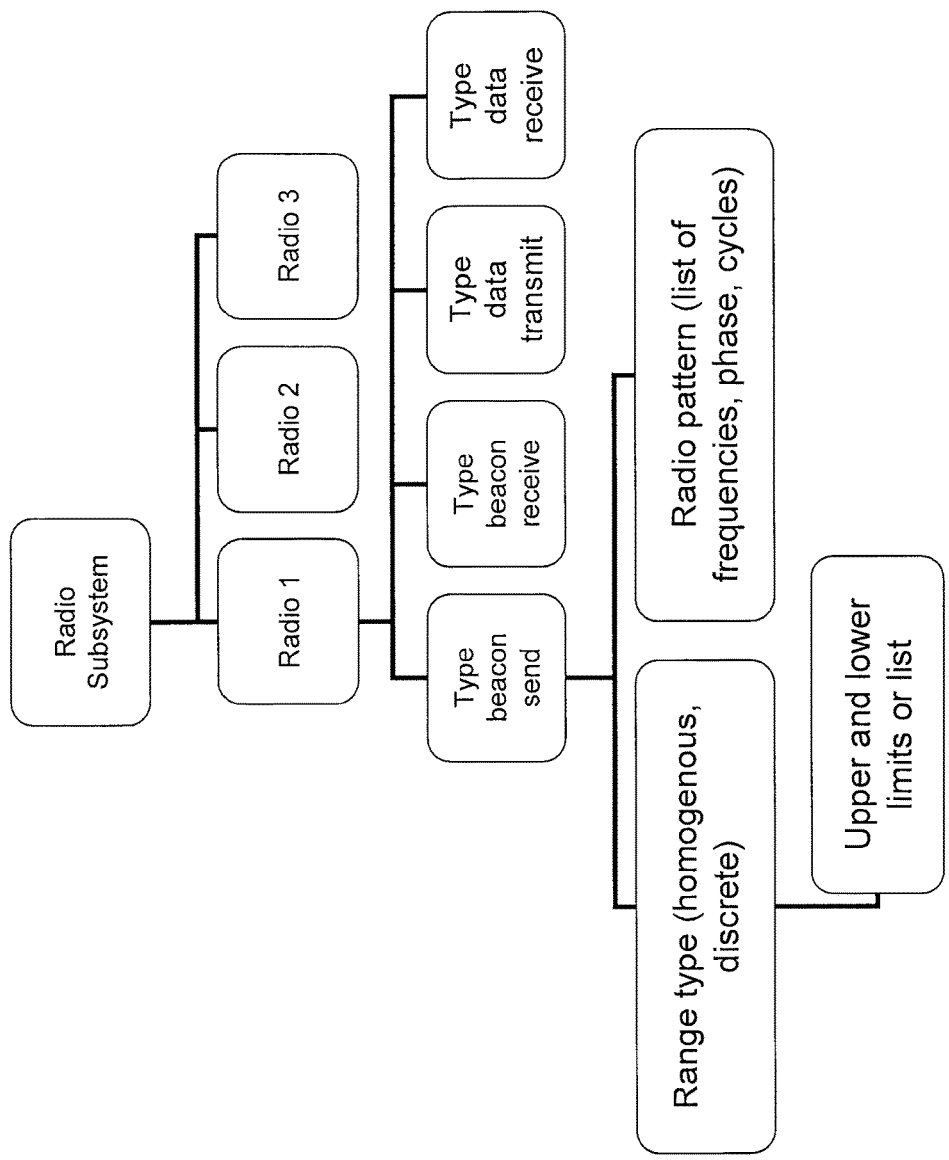
FIG. 9 shows how data for each radio type is organised as a hierarchy in accordance with an embodiment of the present invention.

The radio system is interrogated and the list of radios that the subsystem supports can be enumerated. The data for each radio type is organised as a hierarchy as shown in FIG. 9.

The radio subsystem inquiry tree is enumerated under program control. This interrogation may be instigated by the radio subsystem requesting it. This allows for new devices being plugged in. At present the SDR forum does not include a radio initiated request for interrogation. The system has to issue get con fig commands.

Combined Repetitions

The radios are enabled either by user control or limited by environmental controls. For each of the radios that are enabled a set of repetition rates are found to allow each of the radios to be switched on only when no other radio is on. This mechanism is common to many of the use cases described below.

Use Cases

These use cases are the actions from the upper levels. In particular the enabling of a radio is not to be confused with the low level enable command which effectively powers on the radio. At this level this is likely to be a user command that has enabled or disabled the use of a specific type of radio (e.g. switching on Bluetooth).

Startup
1. All the radios are enumerated,
2. Read the parameters for each radio found
3. Find environmental limits in force (airplane, low power etc.)
4. Find repetition pattern for all allowed radios
5. Set radio patterns or repetitions
6. Enable radios
7. Start radios Radio Removed
1. Find repetition pattern for remaining radios
2. If existing radios are in use, defer change in repetitions.

Radio Disabled
1. Stop radio.
2. Disable radio.
3. Remove radio from repetition pattern
4. Find new repetition pattern for remaining radios
5. Set radio patterns or repetitions Radio Enabled
1. Find environmental limits in force (airplane, low power etc.)
2. Find new repetition pattern for all allowed radios
3. Set radio patterns or repetitions
4. Enable radio
5. Start radio Radio Inserted
1. Read the parameters of the new radio
2. Find environmental limits in force (airplane, low power etc.)
3. Find repetition pattern for all allowed radios
4. Set radio patterns or repetitions
5. If existing radios are in use, defer change in repetitions.
6. Enable new radio
7. Start new radio Low Power
1. Find radios that are to be used
2. Stop and disable all other radios
3. Find repetition pattern for radios
4. Set radio patterns or repetitions Other compliance based use cases may require activities above the radio subsystem. The control requests below allow for these, but the subsystem will not necessarily respond to all aspects. For example it may be necessary to use only certain frequency channels for Bluetooth when visiting certain countries.

Entering a Radio Restriction Area (Airplane Mode)
1. Receive an airplane mode request (see below)
2. Stop and possibly disable radios not allowed
3. Find repetition pattern for remaining radio
4. Set radio pattern or repetition Entering Radio Off Area (Hospital)
1. Receive a beacon receive mode command
2. Stop and possibly disable all radios (not necessarily low power)
3. Enable beacon reception Control Requests These requests are short strings that can be supplied as push messages. This allows airplane mode to be imposed once a device enters an area by pushing the request on one of the radio channels. Interleaving radios will also require monitoring and debugging control requests.

Lowest Power

All radios at lowest repetition rate as well as lowest power output.

Airplane Mode

Only certain radios are allowed. This request sends the radios allowed. See the beacon setting for the situation where only a specific radio is allowed.

All Radios Off

This is reset manually by the user.

Promiscuous Mode

A radio connects to a service all the time or at the maximum rate. This allows the device to act as a monitor for that radio channel Monitor Mode Link to a service and report data transfers via another service. This can be used to test operation of a protocol when the device has no other means of connection like a serial, IrDA, USB port. The reporting may be the complete data or just a summary of the monitored link or service.

Report Mode

Send the N last control requests. This requires the subsystem to maintain the last N requests so it is preferable that a maximum value for N is defined. As these requests are small, there could be a large value for N (e.g. 100,000).

Beacon Listen

Set a radio to listen for a beacon. This mode can be used to indicate when the radio has left a region.

Beacon Send

Set a radio to send a beacon. This mode can be used to indicate if a device leaves a region. This mode can also be used for security purposes.

Lower Level Command

These commands control the radios and the subsystem more directly. These are equivalent to the commands proposed by the SDR forum.

Radio Enabled

This is different from the radio transmitting or receiving. The configuration is set in the radio and it is ready to operate: a start command starts the radio.

Radio Disabled

The radio is no longer ready to be used and should be consuming no power.

Radio Pattern

Some radios may have intelligence and can be set with high level parameters. Others will require that the waveform or burst pattern is set explicitly. This command sends frequency, phase, modulation, cycles, time etc. in the format that is appropriate to the radio. The SDR forum command is set_config.

Simple Repetition

Sends the rate where the other radio components have either been set by the radio pattern command or cannot be set. This is for radios that only have repetition rates, i.e. those radios that are not frequency hopping. The SDR forum commands do not discriminate and so the set_config command is the only one available.

Enumerate Radios

Read the inquiry tree and load up the radio parameters. The SDR forum commands are get_config and capability_exchange. There is currently an undefined overlap in these two commands.

Synchronise Radios

This takes a list of radios and make sure that the repetition rates are synchronised. This may be necessary so the two radios work as a network, forwarding packets. Although this functionality is discussed in the SDR forum, there are no low level commands specified.

Many advantages accrue through the use of this invention, including:

It enables a reduction of power consumption and avoids the wastage of power that would otherwise occur when a device is concurrently connected to multiple wireless standards; this is applicable to all classes of devices, whether mobile or mains powered.

As applied to software defined radio, it allows operation on multiple wireless standards.

When used on communication devices such as cellular telephones, it allows multiple concurrent accounts for wireless delivered services.

Although the present invention has been described with reference to particular embodiments, it will be appreciated that modifications may be effected whilst remaining within the scope of the present invention as defined by the appended claims.

The invention claimed is:

1. A method comprising:
   maintaining, at a mobile communication device, a plurality of wireless connections to other devices, each wireless connection being maintained using a respective radio; and
   while maintaining the plurality of wireless connections, coordinating an arrangement of slotted communication protocols that are to be used by each of the respective wireless connections comprising:
      causing the mobile communication device to wake from a low power mode to a normal mode to operate, in a first time interval, a first set of one or more radios in the mobile device to communicate over a first set of the plurality of wireless connections, respectively; and
      while remaining in the normal mode in a second time interval adjacent in time to the first time interval, operating a second set of one or more radios in the mobile communication device to communicate over a second set of the plurality of wireless connections, respectively; and
      after the second time interval, placing the mobile communication device in the low power mode:
   wherein the operating of a radio in the first set of radios would interfere with the operating of a radio in the second set of radios when operated simultaneously.

2. The method of claim 1, wherein at least one of the other devices forms part of a network.

3. The method of claim 1, wherein one or more of the radios in the mobile communication device can be shared by more than one wireless connection.

4. The method of claim 1, wherein at least one radio in the mobile communication device is a software-defined radio.

5. The method of claim 4, wherein each of the at least one software-defined radios is provided with an API for controlling its operation and providing information relating to its use.

6. The method of claim 1, wherein at least one of the first and second sets of radios comprises a plurality of radios that, when simultaneously operating, do not interfere with one another.

7. The method of claim 1, wherein at least one of the first and second time intervals includes a plurality of time slots.

8. The method of claim 1, wherein the coordinating step further comprises:
   operating a third set of one or more radios to communicate over a third set of the plurality of wireless connections in one of the first and second time intervals.

9. The method of claim 1, wherein the coordinating step further comprises:
   while remaining in the normal mode in a third time interval adjacent in time to the second time interval, operating a third set of one or more radios in the mobile communication device to communicate over a third set of the plurality of wireless connections, respectively; and
   and wherein the step of placing the mobile communication device in the low power mode is performed after the third interval.

10. A mobile communication device comprising:
    a plurality of radios, each maintaining one of a plurality of wireless connections to another device; and
    wherein the mobile communication device is configured to maintain the plurality of wireless connections by coordinating an arrangement of slotted communication protocols that are to be used by each of the respective wireless connections by a plurality of operations comprising:
       waking from a low power mode to a normal mode to operate, in a first time interval, a first set of one or more radios in the mobile device to communicate over a first set of the plurality of wireless connections, respectively; and
       while remaining in the normal mode in a second time interval adjacent in time to the first time interval, operating a second set of one or more radios in the mobile communication device to communicate over a second set of the plurality of wireless connections, respectively; and
       after the second time interval, placing the mobile communication device in the low power mode;
    wherein the operating of a radio in the first set of radios interferes with the operating of a radio in the second set of radios when operated simultaneously.

11. The mobile communication device of claim 10, wherein one or more of the radios in the mobile communication device can be shared by more than one wireless connection.

12. The mobile communication device of claim 10, wherein at least one of the radios in the first and second sets of radios is a software-defined radio.

13. The mobile communication device of claim 12, wherein each of the at least one software-defined radios is provided with an API for controlling its operation and providing information relating to its use.

14. The mobile communication device of claim 10, wherein at least one of the first and second sets of radios comprises a plurality of radios that, when simultaneously operating, do not interfere with one another.

15. The mobile communication device of claim 10, wherein at least one of the first and second time intervals includes a plurality of time slots.

16. The mobile communication device of claim 10, wherein the operation of coordinating the arrangement of slotted communication protocols further comprises:
    operating a third set of one or more of the plurality of radios to communicate over a third set of the plurality of wireless connections in one of the first and second time intervals.

17. The mobile communication device of claim 10, wherein the operation of coordinating the arrangement of slotted communication protocols further comprises:
- while remaining in the normal mode in a third time interval adjacent in time to the second time interval, operating a third set of one or more of the plurality of radios in the mobile communication device to communicate over a third set of the plurality of wireless connections, respectively; and
- and wherein the operation of placing the mobile communication device in the low power mode is performed after the third interval.

* * * * *